Aug. 21, 1945.  H. F. WILLKIE  2,383,176
ART OF DISTILLING SPIRITUOUS LIQUORS
Filed Jan. 31, 1942

HERMAN F. WILLKIE
*INVENTOR.*

BY *Arthur F. Robert*
ATTORNEY.

Patented Aug. 21, 1945

2,383,176

UNITED STATES PATENT OFFICE 2,383,176

ART OF DISTILLING SPIRITUOUS LIQUORS

Herman F. Willkie, Prospect, Ky., assignor to Joseph E. Seagram & Sons, Inc., Shively, Ky., a corporation of Indiana Application January 31, 1942, Serial No. 428,990

4 Claims. (Cl. 202—46)

This invention relates to improved methods of obtaining from distillers beer spirituous liquors which are definitely light in body and relatively free of impurities causing objectionable taste and/or odor characteristics, and more particularly relates to improved methods of distilling spirituous liquors such as whiskey and neutral spirits. The term "distillers beer," as used herein, should not be confused with "beverage beer." Both of these beers are distilled to remove alcohol from the beer residue but, with distillers beer, the alcohol is the primary product, the distillation being for the purpose of recovering the entire alcoholic content of the beer as a quality product leaving the beer residue as a waste product substantially free of alcohol, whereas, with beverage beer, the residue beer is the primary product, the distillation being for the purpose of removing some of the alcoholic content of the beer residue without deleteriously affecting the beverage quality of that residue.

At the present time, two whiskey distilling processes are largely employed, namely, the batch process and the continuous process. In the older batch process of preparing spirituous liquors, a large body of fermented material, such as wine must, beer wort, or whiskey mash, hereinafter referred to as distillers beer, is placed in a charge or batch still and boiled to remove the alcohol and other volatile components therefrom. Whiskies produced from batch processes are heavy bodied and do not have uniform characteristics, especially as regards taste and odor. In the newer continuous process, distillers beer is continuously introduced into the top of a plate-type fractionating column and steam is continuously introduced into the bottom of the column, the two materials passing in countercurrent relation through the column with the time of throughput, i. e. the time required for the passage of the relatively nonvolatiles in the fermented material down through the column, averaging from 12 minutes upwards. The whiskies produced by continuous processes are much superior to those produced by batch processes in that they have a lighter body and are more uniform.

In application Serial #307,392, filed December 4, 1939, it is disclosed that the quality of whiskey, for example, is progressively improved as the boiling temperature of distillers beer in the continuous fractional distillation process is progressively reduced below the normal distillation temperatures (210–216° F.).

It has now been discovered that the quality of spirituous liquors produced by the continuous process is further improved as the contact time between distillers beer and the distillation medium or the time distillers beer is maintained at or near its boiling point is reduced. This has been found to be true regardless of the distillation temperature employed although the improvement is much more noticeable at the higher temperatures.

Therefore, an important object of this invention is to provide an improved method of distillation whereby alcohol distillates of superior taste and more desirable characteristics than previous distillates can be obtained.

A further object of this invention is the provision of an improved method of distillation whereby spirituous liquors such as whiskies having relatively light bodies and superior tastes can be produced.

Apparatus suitable for the practice of the present invention is illustrated in the accompanying drawing, wherein.

In accordance with the present invention, distillers beer, during its time of contact with the steam, is widely and uniformly distributed by flowing it over a succession of louvres, through successive sprays, or over extensive surfaces in the form of relatively thin layers or films, so as to present a relatively large contact surface to the vapors and, at the same time, eliminate the need for a long period of liquid hold-up, or time of retention, in the column while exposed to the high or boiling temperature. The rate of travel of distillers beer down through the column in this process is thus increased so that substantially complete "stripping," i. e. complete separation of the volatiles from the relatively non-volatiles, takes place during a throughput period of from one to five minutes.

A marked improvement in the taste and quality of the whiskey or neutral spirits is obtained when the time during which distillers beer is in contact with the hot vapors is thus shortened, greater improvement occurring as the time is progressively shortened, so long as sufficient fractional distillation is maintained, this improvement being apparently due to the shorter time period during which certain constituents in distillers beer may react to produce undesirable products passing into the distillate. Whiskey having the most desirable properties is obtained when the beer contacts the hot vapors for, or has a throughput time of, less than two minutes or so.

At the same time, the temperature differential essential to fractional distillation is insured by the different concentrations of alcohol at different levels, the flow of the vapors in an upward direction being effected by the momentum of the steam and the reduced pressure produced in the condensor.

Figure 1:
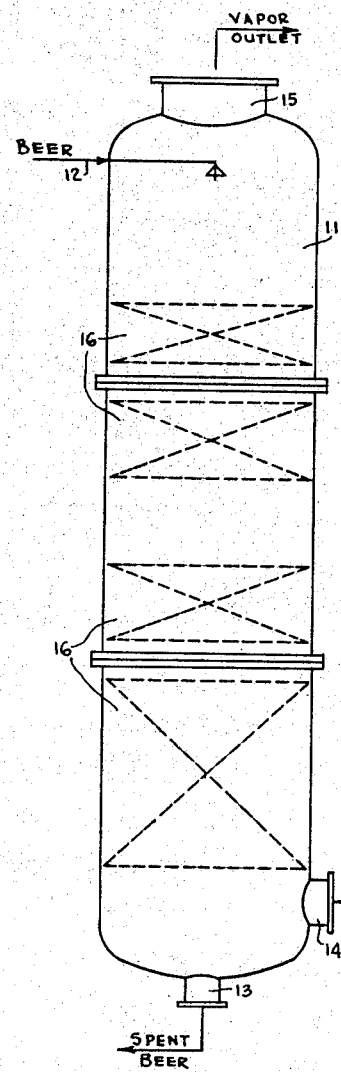
Figure 1 is a schematic elevation of a fractionating column particularly adapted for the practice of the present invention.

In one mode of practicing the present invention, the beer is stripped in a column of the type generally indicated at 11 in Figure 1. Column 11 generally is in the shape of a vertical tube, as is conventional, and includes an inlet 12 for the beer, the inlet having means for distributing the liquid over the entire cross-section of the column in a well-known manner. An outlet 13 is provided at the bottom of the column for the exit of the spent liquid or alcohol-free slop.

An inlet 14 is provided at the base of the column for the entry of the heating medium such as steam, a vapor outlet 15 being provided at the top of the column for the vapor.

Figure 2:
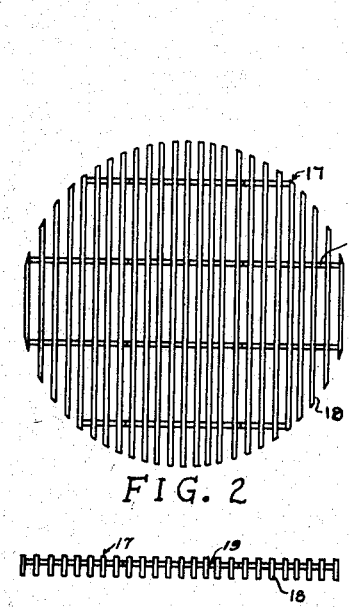
Figure 2 is a plan of a type of louvre grid adapted for use with the column of Figure 1.
Figure 3:
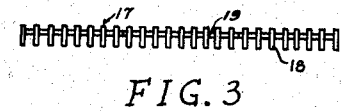
Figure 3 is a side elevation of the grid of Figure 2.

In sections 16 of the column indicated by broken lines, a series of grids 17 are provided, preferably of the form shown in Figures 2 and 3. Each grid comprises a plurality of substantially parallel relatively thin strips 18 about 4" in width, horizontally disposed with their widths in substantially vertical planes. Each grid is preferably divided into separate sections as shown in Figure 2 secured together by dowel pins 19.

When the grids are assembled in the column in tiers, they are preferably arranged so that the louvres of adjacent grids are angularly disposed to one another, preferably at right angles, to form lattice-like grid sections whereby the liquid flowing therethrough is successively broken up into a number of separate streams, thereby increasing its contact with the vapors traveling in the opposite direction.

In operation, the beer is introduced at inlet 12, and the slop taken off at outlet 13. Steam at a temperature to effect boiling of the beer at the predetermined desired temperature is introduced through inlet 14, the vapor being taken off at outlet 15. Thus the hot vapor passes in a direction counter to the direction of flow of the beer, causing the latter to be progressively heated and boiled and the volatiles removed therefrom.

In lieu of grids 17, "copper mesh" of the type disclosed in Patent #1,676,191 may be employed. Such mesh insures a large area of contact between the descending liquid and the ascending vapor.

Figure 4:
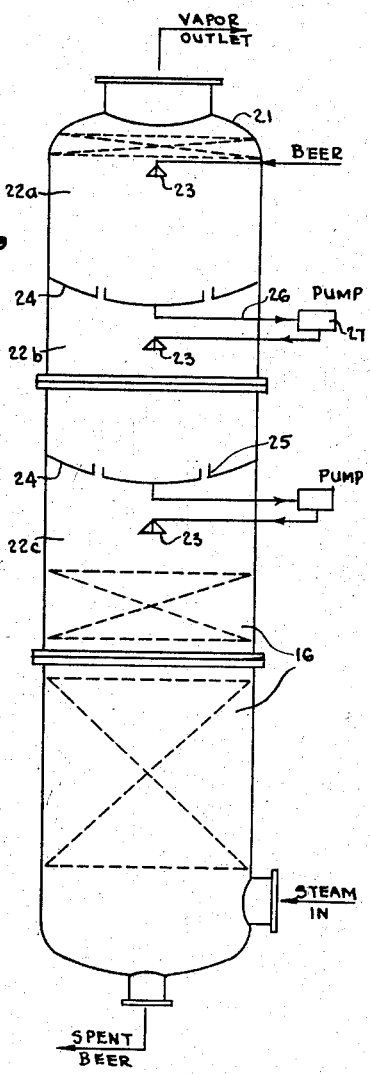
Figure 4 is a schematic elevation of a modified form of column adaptable for the practice of the present invention.

Good results have also been secured with a column of the type shown in Figure 4, wherein the column 21 includes a series of vertically disposed spray compartments 22a, 22b and 22c so arranged that the descending liquid and the ascending vapor pass successively through each compartment. Each of the upper spray compartments includes a spray nozzle 23 and a collector plate 24, the latter preferably being dished and provided with a plurality of short stand pipes 25 which permit the passage of vapors upwardly and prevent the escape of the liquid except through discharge pipes 26. Each of the pipes 26 is connected to a pump 27 which forces the liquid back into the column and out of the spray nozzle 28 connected thereto.

In distilling with column 21, the beer is sprayed into the upper portion of compartment 22a into contact with the rising vapor. A portion of the volatiles is removed from the beer in compartment 22a by substantially simple distillation. The residue which collects on collector plate 24 of the upper compartment is rapidly removed by pump 27 and resprayed into the next compartment 22b which is at a higher temperature than compartment 22a, primarily because of the different concentration of alcohol therein.

Similarly, the liquid collecting on the collector plate 24 of compartment 22b is successively sprayed into compartment 22c, which is at a still higher temperature than the preceding compartment 22b.

To further increase the desired fractionation or stripping, grid sections 16 of the type shown in Figures 2 and 3 are preferably provided beneath spray compartment 22c as shown in Figure 4. However, if desired, a spray column such as that illustrated in Figure 4 may be utilized having only collector plates 24 between the separate spray compartments and no grid sections.

When the mechanism of a spray is utilized to increase the surface area of contact between the beer and the vapors, a plurality of separated spray compartments is required in order to maintain efficient stripping.

A spray column, such as that shown in Figure 4, or a column such as that shown in Figure 1, containing large surface areas which do not appreciably impede the downward flow of the beer is preferred to the usual plate type of column or to bubble-cap columns which contain a plurality of plates, on each of which a portion of the beer collects. When such plate or bubble-cap columns are used, the time of contact between the vapors and the beer is relatively long because of the quantity of liquid held on the plates. This apparently affords time for the undesirable reactions avoided by the present invention.

Even such columns, however, may, with sufficient modification, such as the lowering of the liquid level on the plates, be utilized in the practice of the present invention. Such lowering of the liquid level decreases the retention time of the beer in the column. The results, however, are not equivalent to those obtained when the beer is maintained in contact with the hot vapors in a form where the liquid hold-up is materially decreased, as in the case with the apparatus of Figures 1 to 4.

As an example of the method of practising the invention with the column of Figures 1–3 inclusive and as proof of the advantages obtained thereby over prior methods, beer was taken from the same beer well and fed into two continuous column stills. The rate and temperature of feed in both cases were the same. One still was of the conventional plate type and the other was of the type shown in Figures 1–3, inclusive. The base temperature in both stills was 182° F., and the concentration of the overhead vapors in both cases was 80° proof.

In the plate still, which was operated in conventional manner, the beer was in contact with the hot vapors for, or had a time of throughput of, about 15 to 20 minutes.

With the second still, the beer went through the still in less than two minutes, sufficient steam being introduced to accomplish substantially complete separation of the volatiles from the relatively non-volatiles.

In each case, the spent beer or slop removed from the base of the column was substantially alcohol-free.

As evidenced by the results of standard tests shown in the following table, the wiskey produced by the method of the present invention was far superior to the whiskey produced in the conventional manner.

|  | Percent preference | | Magnitude of tactual property |
|---|---|---|---|
|  | Taste | Odor |  |
| Reduced time method | 21.4 | 21.5 | 14.8 |
| Conventional method | 11.9 | 11.8 | 18.5 |

The marked improvement in taste and odor is believed to be due largely to the fact that the decomposition of nitrogenous bodies, and the production of undesirable products that would be carried over with the distillate is greatly reduced by reducing the time of throughput, i. e. the time at which the liquid is held at the distillation temperatures.

As an example of the practice of the present invention, with the column of Figure 4, beer was fed into a still of this type at the rate of 90 gallons per minute and at a feed temperature of 90° F.

Saturated steam at 10 lbs. pressure (gauge), throttled and desuperheated to 103° F., was fed into the base of the still at the rate of 12,500 lbs. per hour. The temperatures at the base, the middle and the top of the column were, respectively, 101° F., 98° F., and 92° F. The pressure drop between the top and bottom of the still was 0.5" Hg and the throughput time about 1 minute.

The discharged vapor, when condensed, was found to be about 40° proof and of very high quality.

Having described the invention, the following is claimed:

1. In a method of fractionally distilling distillers beer to produce a spirituous liquor characterized by a relatively light body and freedom from impurities imparting objectionable taste and/or odor characteristics, an improvement comprising: passing a column of steam upwardly at a controlled rate through a fractionating column; passing distillers beer downwardly through the fractionating column, in counter current relation to the steam column, at a substantially constant rate such that the length of time the beer is in the counter current steam path is not more than five minutes; and maintaining an extensive and uniform distribution of beer across and along the counter current steam path so that it presents a steam-contacting surface area sufficiently extensive, at the rates of beer and steam flows, to boil the beer throughout the counter current path and cause complete fractional distillation from the beer of its alcoholic content in the form of vapor, leaving a waste slop residue substantially free of alcohol, the concentration of alcohol in the beer and vapor increasing in a progressive manner upwardly along the counter current path.

2. In a method of fractionally distilling distillers beer to produce a spirituous liquor characterized by a relatively light body and freedom from impurities imparting objectionable taste and/or odor characteristics, an improvement comprising: passing a column of steam upwardly at a controlled rate through a fractionating column; passing a free gravity-flowing stream of distillers beer downwardly through the fractionating column, in counter current relation to the steam column, at a substantially constant rate such that the length of time the beer in the counter current steam path is not more than five minutes; and breaking up the beer stream into a number of wide shallow streamlets uniformly distributed across and along the counter current steam path so that it presents a steam-contacting surface area sufficiently extensive, at the rates of beer and steam flows, to boil the beer throughout the counter current path and cause complete fractional distillation from the beer of its alcoholic content in the form of vapor, leaving a waste slop residue substantially free of alcohol, the concentration of alcohol in the beer and vapor increasing in a progressive manner upwardly along the counter current path.

3. In a method of fractionally distilling distillers beer to produce a spirituous liquor characterized by a relatively light body and freedom from impurities imparting objectionable taste and/or odor characteristics, an improvement comprising: passing a column of steam upwardly at a controlled rate through a fractionating column; spraying distillers beer at a substantially constant rate from one point in the fractionating column downwardly through one portion of the fractionating column in counter current relation to the corresponding portion of the steam column; and collecting and respraying the beer at the same rate in counter current relation to the steam column at successively lower portions of the fractionating column so that the beer presents a steam-contacting surface area sufficiently extensive, at the rates of beer and steam flows, to boil the beer throughout the counter current path and cause complete fractional distillation from the beer of its alcoholic content in the form of vapor, leaving a waste slop residue substantially free of alcohol, the concentration of alcohol in the beer and vapor increasing in a progressive manner upwardly along the counter current path.

4. The method of claim 1 wherein: the beer is passed through the column by spraying it from one area in the fractionating column downwardly through one portion of the fractionating column in counter current relation to the corresponding portion of the steam column; and repeatedly collecting and respraying the beer in counter current relation to successively lower portions of the steam column from successively lower areas of the fractionating column.

HERMAN F. WILLKIE.